United States Patent Office 3,558,297
Patented Jan. 26, 1971

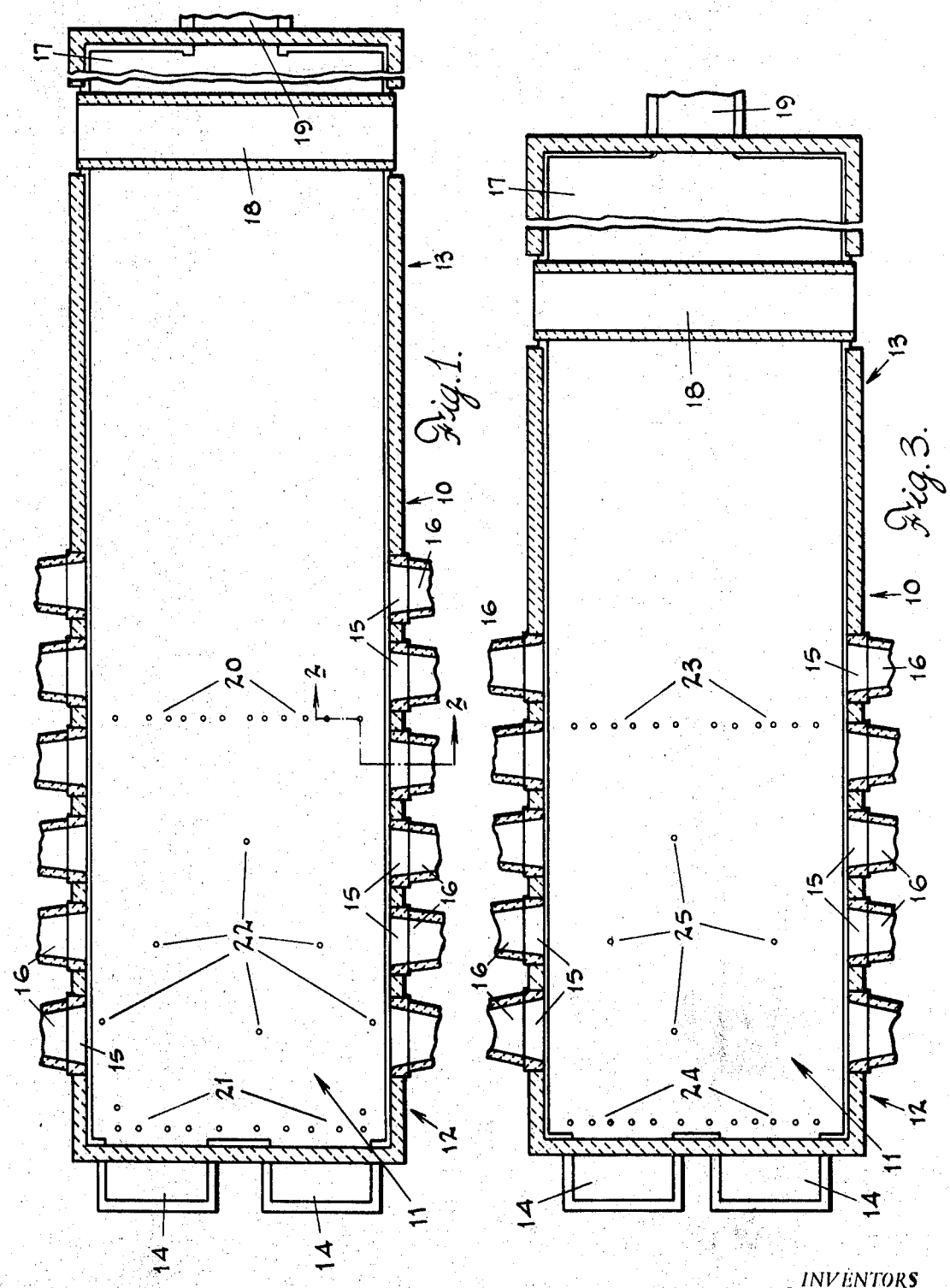

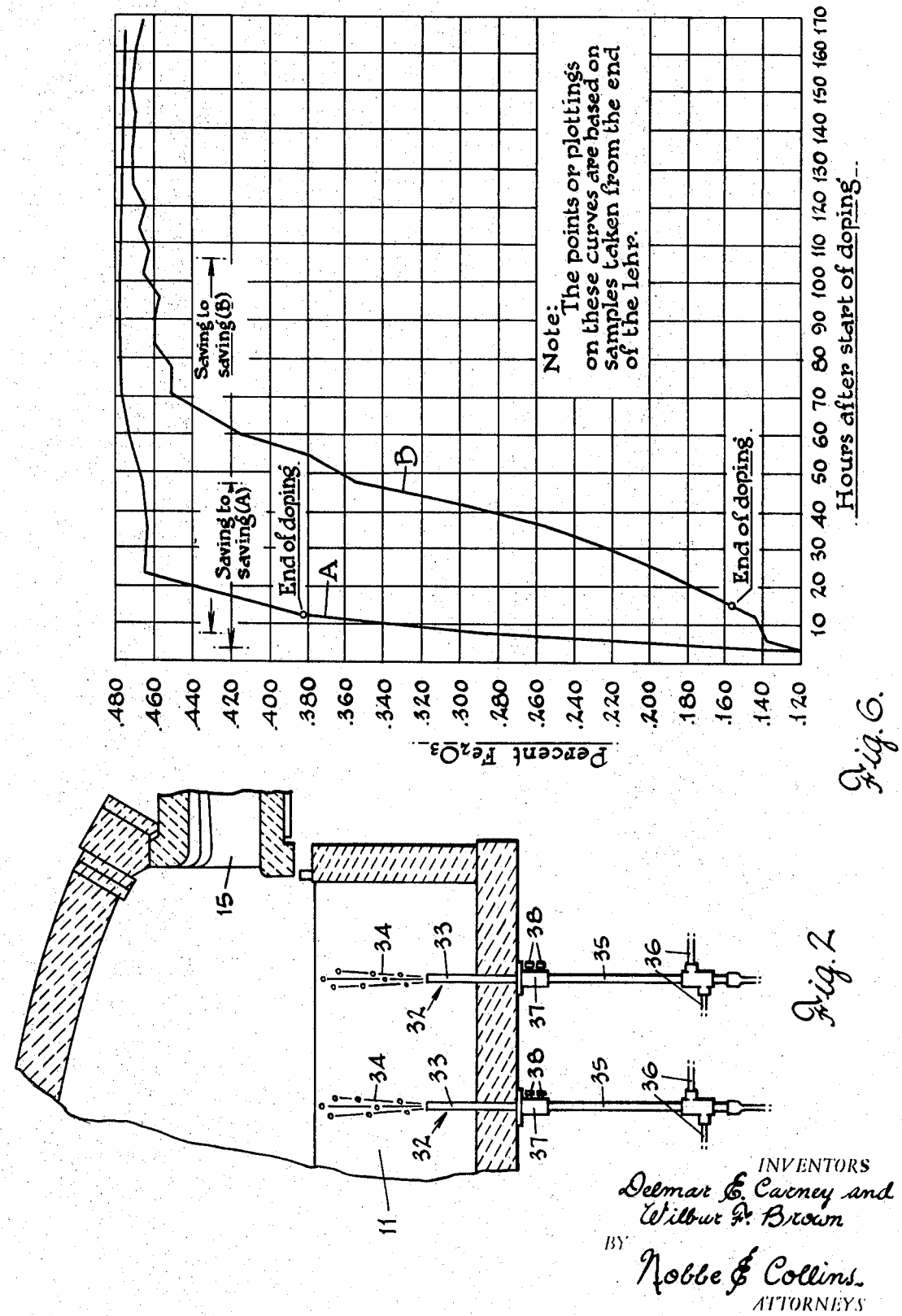

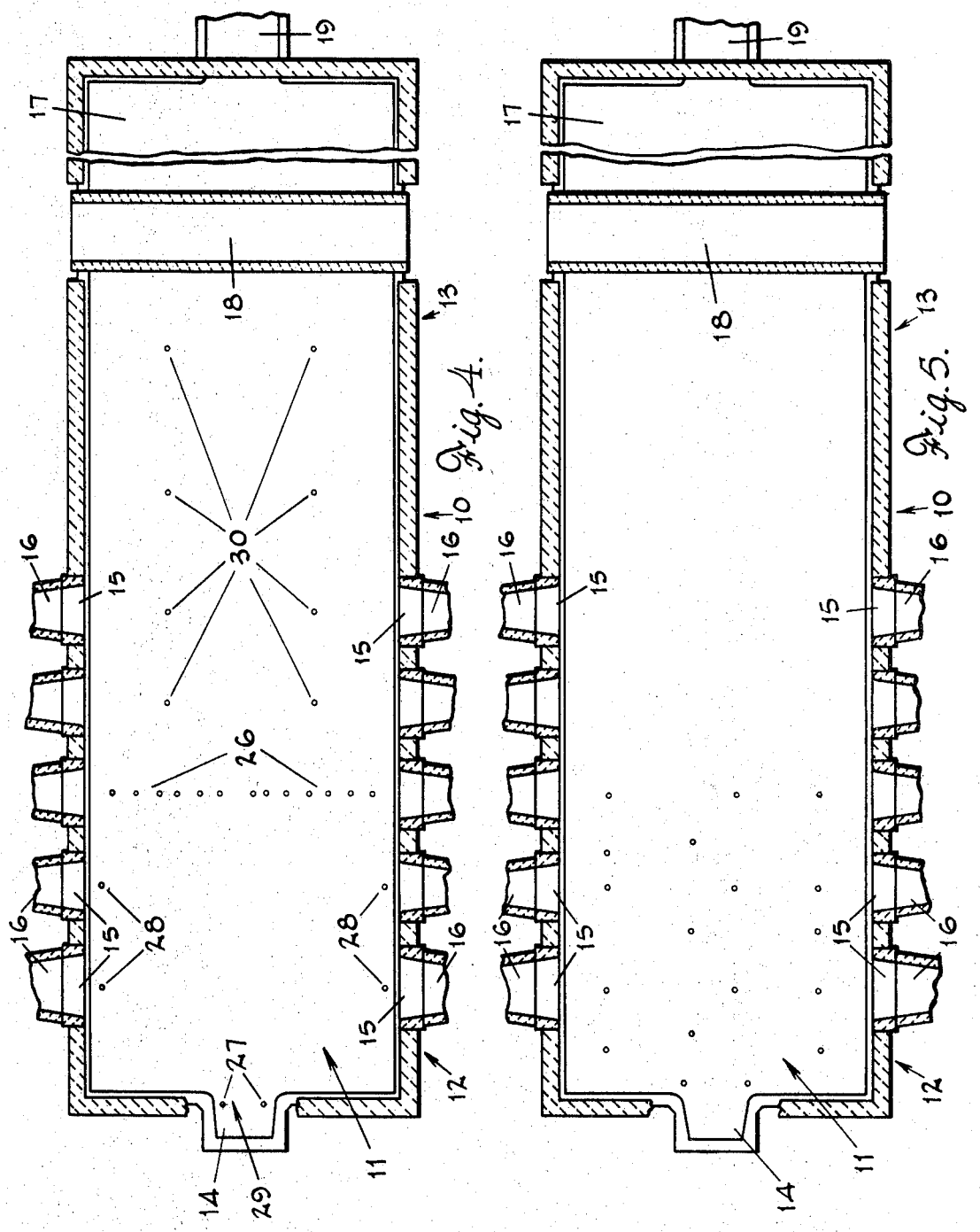

3,558,297
METHOD FOR CHANGING OVER FROM ONE GLASS TO ANOTHER GLASS WHILE SIMULTANEOUSLY BUBBLING
Delmar E. Carney, Sequim, Wash., and Wilbur F. Brown, Toledo, Ohio, assignors to Libbey-Owens-Ford Company, Toledo, Ohio, a corporation of Ohio
Filed Oct. 10, 1966, Ser. No. 585,369
Int. Cl. C03b 5/16
U.S. Cl. 65—134                    13 Claims

ABSTRACT OF THE DISCLOSURE

Changing a tank furnace from a first glass being produced therein to production of a second glass having an appreciably higher iron content by charging into the molten glass at the melting end the regular batch material for producing the higher iron second glass, along with a portion of the deficiency of iron oxide in the furnace before the start of the changeover as compared to the iron oxide content therein for production of the second glass, and simultaneously bubbling fluid through the molten glass in the upstream portion of the furnace.

---

The present invention relates broadly to the manufacture of glass and more particularly to improved methods and apparatus for use in uninterruptedly producing a succession of specifically different kinds of glasses from one continuously operating tank furnace.

Originally, whenever it was desired to produce glasses of different compositions from the same tank furnace, it was necessary to cut the sheet, drain the furnace of the kind of glass being produced, then refill it with glass of the different composition desired and then restart the sheet.

However, in the U.S. Pat. No. 2,900,264, granted Aug. 8, 1959 to W. F. Brown, there is described a procedure for changing the composition of the glass in large glass tank furnaces from regular glass, with a low fixed percentage of iron, to glare resistant glass, with a high fixed percentage of iron, while maintaining the tank furnace in continuous operation. This involved (1) calculating the deficiency of iron oxide existing in the regular glass in the tank furnace at the start of the changeover period, as compared to the iron oxide content required in the furnace for the production of the higher iron, glare resistant glass; (2) then adding to the regular glass in the furnace a fixed percentage of this calculated deficiency, along with the usual glare resistant glass batch materials, during one or more time periods; and (3) thereafter adding only the usual glare resistant glass batch materials to maintain the desired different composition.

This above described part of the patented procedure, by which the composition of the glass in the furnace is changed from regular to glare resistant glass "on the fly," is known as "doping" the tank. The part of the patented procedure in which iron oxide is eliminated from the batch materials fed to the furnace to change from the glare resistant glass back to regular glass is known as "undoping"; and the repetition of the first part of the procedure to again produce glare resistant glass is known as "redoping."

However, in the patent, the largest percentage of the calculated iron oxide deficiency added in any of the examples is 70% and the shortest doping period given is 15 hours (Example 3). Moreover the patent warns (column 3, lines 4 to 9) that, if more than 75% of the calculated deficiencies are added, serious ream problems develop, the transition time from good low iron to good high iron glass is actually lengthened and the balance of the tank may be seriously upset.

Also, in this connection, it must be realized that the "transition" time (from commercially acceptable glass of one kind to commercially acceptable glass of another) is always considerably longer than the "doping" time. For example, in actual practice the 15 hour doping time of Example 3 in the patent involves a transition time, i.e., period from the last production of acceptable regular (0.120% iron) glass to the first production of glare-resistant (0.475%) glass that can be saved, of from 4 to 5 days.

With the present invention, on the other hand, and working with the same kinds of glass, the percentage of the calculated deficiency that can be added during doping is increased to 90% with a corresponding decrease in doping time to 12 hours. Moreover, far from adversely affecting glass quality or interfering with tank balance, the procedures of this invention actually improve "ream" conditions and, at the same time, reduce the interim or transition (saving good glass to saving good glass) period by more than half.

As an indication of the importance of this saving, on one continuous furnace of the assignee company commercial demands recently necessitated changing from one kind of glass to another between 20 and 30 times during a single campaign of the tank.

Accordingly it is a primary object of the invention to increase the productive and decrease the non-productive hours of a glass tank furnace which is operated continuously to produce glasses of a number of different compositions.

Another and more specific object is to provide a more efficient procedure for doping, undoping and redoping a continuously operating glass tank furnace on the fly.

Another object is to improve the quality of the glass produced under such conditions.

Briefly stated these, as well as other objects, are accomplished by bubbling a fluid through the glass in the tank furnace during the doping, undoping and/or redoping phases of the furnace operation.

Therefore still another object of the invention is to provide a method of an apparatus for bubbling a fluid through the molten glass in selected areas of a continuous tank furnace.

Further objects and advantages of the invention will become more apparent during the course of the following description when read in connection with the accompanying drawings.

In the drawings, wherein like numerals are employed to designate like parts throughout the same:

FIG. 1 is a plan view of a conventional continuous tank furnace of a type commonly employed in making flat glass and in which has been indicated diagrammatically a preferred form of bubbling pattern to be used in practicing the present invention;

FIG. 2 is a fragmentary, transverse sectional view taken subtantially along the line 2—2 in FIG. 1;

FIGS. 3 to 5 are views generally similar to FIG. 1 showing modified forms of the invention; and FIG. 6 is a graphic illustration of the effectiveness of the doping procedure of this invention, compared with the most efficient prior art doping procedure heretofore known.

Referring now more particularly to the drawings, the continuous glass tank furnace illustrated in FIGS. 1 and 3 to 5 are of a general type commonly employed in making flat glass and have been shown in plan with the cap or roof removed. Such furnaces usually include a major tank portion 10 containing a mass of molten glass 11 and roughly divided into a melting end 12 and a refining end 13. Glass making materials, known as the batch, and including both raw materials in finely divided form and cullet, are fed through a dog house or dog houses 14 into the melting area 12 which may be heated by flames directed alternately thereacross, first from one side and then from the other, through ports 15, by the operation of regenerators 16. From the melting end 12 the molten glass 11 flows first into the refining end 13, then into a cooling or conditioning chamber 17, the atmosphere above which is separated from the atmosphere above the refining area by a hung arch 18, and finally into a channel or working receptacle 19 from which a continuous ribbon of flat glass may be drawn, rolled or floated into finished sheet glass, plate glass blanks, or float glass depending upon the type of forming apparatus employed.

Generally speaking, practically all of the commercial flat glasses produced in such furnaces are soda-lime-silica glasses and do not differ greatly in composition regardless of whether the final product is to be window or sheet glass, ground and polished plate glass or the relatively new product float glass. For example, a basic batch suitable, with relatively minor alterations, for the commercial production of any of the above "regular" flat glass products is, as employed in producing regular commercial plate glass:

|  | Lbs. |
|---|---|
| Sand | 1000 |
| Limestone | 212.5 |
| Dolomite | 125 |
| Soda ash | 301.5 |
| Salt cake | 40 |
| Arsenic | 3.98 |
| Carbon | 3.26 |
| Rouge | 1.32 | and this will yield a glass of the following composition:

|  | Percent |
|---|---|
| $SiO_2$ | 71.98 |
| $Fe_2O_3$ | .120 |
| $Al_2O_3$ | .233 |
| $TiO_2$ | .014 |
| $CaO$ | 11.16 |
| $MgO$ | 2.06 |
| $Na_2O$ | 13.84 |
| $SO_3$ | .40 |
| $As_2O_5$ | .19 |
| Total | 99.997 |

The principal departures from the above batch and composition occur when it is desired to produce glare resisting or heat absorbing glasses (of green or blue-green color) or tinted architectural glasses (of grey or bronze color). The compositions of all of these are much higher in iron than are "regular" (plate or window) glasses of the same character and some of them also require additional coloring materials not present, either in regular glasses or in others of these "specialty" glasses.

To illustrate, besides the higher iron content, that is present in all of them, blue-green glare resistant and heat absorbing glasses, architectural bronze and architectural grey glasses also include cobalt, the latter two further include selenium and architectural grey includes nickel. Average amounts of the added colorants contained in actual representative commercial glasses, per 1000 pounds of batch sand, are shown in the following table:

| Glass | Percent $Fe_2O_3$ | Percent $Co_3O_4$ | Pounds Se | Percent NiO |
|---|---|---|---|---|
| Regular plate | .12 | | | |
| Heat absorbing | .48 | .0007 | | |
| Bronze | .38 | .0033 | 1.3 | |
| Grey | .27 | .0071 | 1.0 | .0092 |

As disclosed in U.S. Pat. 2,900,264, a continuous tank furnace making regular glass can be doped to change over on the fly to the production of a specialty glass having additional iron and another colorant (cobalt) in its composition; then undoped to return to the production of the regular glass; and subsequently redoped to change over again to producing the specialty glass.

In accordance with the present invention these same things can be achieved, and with more involved variations in the successive glass compositions, while at the same time notably improving glass quality and cutting the loss in production time by half.

As indicated above, this is accomplished according to the invention by bubbling a fluid and preferably a gas, through the molten glass in a selected area or areas of the glass tank furnace; and, in FIGS. 1 and 3 to 5 of the drawing, a number of specific bubbling patterns have been indicated in connecton with some specifically different forms of the same general type of continuous glass tank furnace.

Thus, the furnace of FIG. 1 is one designed primarily for supplying glass to a "float" machine, whereas those of FIGS. 3 to 5 are representative plate glass funnaces.

However, all such furnaces operate in essentially the same way and all of them, in their normal operation, develop a so-called "hot spot" which is a transverse region in the molten glass, extending from side to side of the tank furnace and located in the general area between the melting and refining ends. Because the glass is hottest in this region, it will be expanded to its greatest extent there and, at the same time, will be relatively less dense than the glass at either side. Consequently, since thermal currents tend to flow from relatively hot toward relatively colder areas, a "flowing spring" action results at the hot spot and the glass actually runs downhill from this hottest region, where it is expanded most, toward the cooler areas at the ends of the furnace, where it is expanded least.

The exact location of the hot spot in any flat glass furnace is dependent upon a number of thing including the size and type of furnace and the firing technique being employed. Also the hot spot can be shifted or its location maintained within a predetermined area by proper control of the furnace fires. However in normal operation the hot spot in a commercial flat glass furnace will usually be found in the downstream portion of the "firing area," i.e., the portion of the tank that is "covered" by the fires from the regenerators. This is true regardless of whether the furnace is side fired or end fired but, in a side fired furnace as shown here, it is usually at or downstream from the third port and upstream from the last one.

In this same connection, while the major upstream portion 10 of a typical flat glass furnace has here been described as being divided into a melting and a refining end, it should be understood that there is no sharp line between the two although the hot spot is considered by many to constitute a rather loose area of division between melting and refining. Similarly, while the area 17 has been described here as a conditioning or cooling chamber, some refining of the glass may take place there. Indeed variations in the size, shape and functions of the several furnace parts from those specifically shown and described here, especially in the downstream portion, may often occur or be resorted to, depending on the end product to be produced.

These points should be appreciated in considering the specific examples of bubbler patterns illustrated in FIGS. 1 and 3 to 5 of the drawings. Thus, in FIG. 1 there is shown a preferred pattern which has given excellent results when used in a six port float furnace. The overall pattern includes a linear pattern of bubblers 20 extending across the furnace in the vicinity of the hot spot; a second and similar linear pattern 21 adjacent the melting end of the furnace; and a third, diamond shaped pattern made up of bubblers 22 intermediate the two linear paterns.

FIG. 3 illustrates a similar general bubbling pattern that, as will be more clearly hereinafter shown, produced remarkable results when employed in connection with the doping, undoping and redoping of the five port plate glass furnace with which it is shown. Like the pattern of FIG. 1, that of FIG. 3 includes rows of bubbles 23 and 24 in the vicinity of the hot spot and adjacent the melting end respectively of the furnace as well as a quadrangular or diamond shaped pattern of four bubblers 25 therebetween. However, because of the portable difference in the firing of five and six port furnaces, the linear pattern 20 of FIG. 1 may be somewhat farther downstream in relation to the hot spot than the corresponding pattern of FIG. 3.

Another modified form of bubbling pattern that has been successfully used in commercial production is shown in connection with a five port plate glass furnace in FIG. 4. Like FIGS. 1 and 3, the general bubbler pattern of FIG. 4 includes a transverse line of spaced bubbler tubes 26 in the vicinity of the hot spot. The FIG. 4 pattern also includes bubblers 27 adjacent the melting end and an additional quadrangular pattern of bubblers 28 between the patterns of bubblers 26 and 27. However, bubblers 27 are actually located in, and at the exit end 29 of the dog house and bubblers 28 are arranged in an elongated rectangular pattern. The modified over-all pattern of FIG. 4 also differs by including an additional, generally quadrangular or rectangular pattern of bubblers 30 that extends well beyond the firing and into the refining area of the furnace with at least the greater number of these bubblers being located downstream from the hot spot.

FIG. 5 shows still another modified bubbling pattern which has also been successfully used commercially on a five port plate glass furnace such as that with which it is illustrated. Like the others, this pattern also includes bubblers in the vicinity of the hot spot, bubblers adjacent the melting end, and bubblers therebetween. The general bubbling pattern also includes linear, triangular and quadrangular groupings of the individual bubblers but the general arrangement is somewhat less balanced and more irregular than are the patterns of FIGS. 1, 3 and 4.

A preferred form of individual bubbler, to be used in making up patterns such as those of FIGS. 1 and 3 to 5, is best illustrated at 32 in FIG. 2 of the drawings. Specifically, this may comprise a bubbling tube assembly such as described and claimed in an application of Delmar E. Carney et al., Ser. No. 112,045, filed May 23, 1961. Generally, it includes a bubbler tube 33 which extends upwardly through the bottom of the tank furnace into the molten bath 11 and through which air or other fluid is forced to produce bubbles 34. The tube 33 is cooled by a water jacket 35 within which it is enclosed and through which water or other cooling fluid is circulated by means of inlet and outlet connections 36.

Among the advantages of a water cooled bubbler tube is that any molten glass tending to enter the tube when the bubbling air is stopped will be frozen at the exit and where it can be readily blown out whenever it is desired to start the bubbling again. This permits the bubbling to be either intermittent or continuous and to be employed only during doping and/or undoping or for as long a period before and after as is found to be desirable.

Another advantage of the water cooled bubbler is that it may be pushed upwardly into the molten bath as far as desired and also has its height adjusted to meet conditions at its particular location. For this purpose a collar 37 is secured to the bottom of the furnace in surrounding relation to the water jacket 35; and set screws 38 are provided to retain the bubbling tube 33 at the desired height in the bath 11 and to permit its height to be adjusted.

The bubblers illustrated in FIG. 2 are part of a linear pattern (FIG. 1) and are preferably provided with $\frac{3}{16}$ inch diameter openings and located anywhere from one to two feet apart. Bubbling air may be supplied thereto at around 20 pounds per square inch during most of the bubbling cycle; but initial pressures up to around 90 pounds may be desirable to blow out the tubes at the start of bubbling and subsequent pressures of around 10 pounds may be found sufficient as the end of the bubbling cycle is approached.

The manner of operating glass tank furnaces of the character illustrated in FIGS. 1 and 3 to 5 to continuously produce a succession of different glasses in accordance with this invention will be specifically described in connection with the five port plate glass furnace shown in FIG. 3. This tank furnace contained about 1100 tons of molten glass and upwards of 350 tons of glass batch materials were being filled into the melting end 12, while approximately 300 tons of plate glass were being removed from the working channel 19, during each 24 hour period.

In changing from the production of regular plate glass to heat absorbing plate glass on this furnace the deficiency of $Fe_2O_3$ was first calculated. For the 1100 ton tank it was found to be .36% or 7920 pounds. Since the rouge commonly used to supply iron oxide contains 97% $Fe_2O_3$, 8164.95 lbs. of this rouge would be needed for 100% conversion of the regular glass in the tank. By a similar calculation, the amount of $Co_3O_4$ required for 100% conversion of the regular glass in the tank was found to be 15.4 lbs. However, in order to prevent overshooting by the addition of too much $Fe_2O_3$ and $Co_3O_4$, only predetermined, fixed percentages of their calculated deficiencies can be added. This is because the first of the transition glass removed from the furnace will contain less than the required amount of $Fe_2O_3$, for example, and so the amount calculated to produce 100% conversion of all of the glass in the tank is never actually used.

Heretofore, the heat absorbing composition (including .48% iron oxide) has been obtained in such a tank when about 43%–75% of the above calculated amounts were added over periods varying from 3 days to 15 hours. It was appreciated that the higher this percentage could be the more rapid would be the rate of conversion but, with the then known techniques, when more than 75% of the calculated amount of iron oxide was added ream problems become serious and the transition time from good regular plate glass to optically good heat absorbing glass was actually lengthened and the balance of the tank sometimes seriously upset.

With the bubbling techniques of the present invention, on the other hand, an appreciably larger percentage of the calculated iron oxide deficiency can be added and a more rapid conversion rate thus obtained without creating an objectionable ream condition or upsetting the furance balance.

Thus, the glass tank equipped with the bubbler arrangement shown in FIG. 3, and while producing regular plate glass, was changed over to the production of heat absorbing glass on the fly, and without cutting the sheet, by feeding to the furnace, over a 12 hour period, approximately 7,348 pounds of rouge, or sufficient to supply 90% of the calculated iron oxide deficiency, while, at the same time, feeding the batch normally used in producing heat absorbing glass at its normal rate; and simultaneously bubbling air at a pressure of 20 pounds per square inch through the molten glass in the bath 11 in the patterns indicated at 23, 24 and 25. The additional or so-called doping rouge was added at a uniform rate throughout the doping period by first dividing the 7,348 total pounds required by the number of batches to be mixed and filled during the doping period to get the amount to be added to each standard heat absorbing batch during the doping period.

Thereafter, feeding or charging of the normal heat absorbing glass batch, but without an additional iron oxide, was continued in accordance with normal production procedure.

All of the glass produced during the transition period was free of ream; and, since the furnace continued to produce regular plate glass of acceptable commercial quality for three hours after doping was started and began producing heat absorbing plate glass of commercially acceptable color and quality within 47 hours after doping started, the actual transition time between saving and saving was approximately 44 hours.

The doping and transition period as just described are graphically illustrated by the curve A in FIG. 6 of the drawings. Thus, as there shown, from approximately 3 hours after doping was started, up to and beyond the end of the 12 hour doping period, the percentage of iron in the finished glass continued to rise steeply. At approximately 20 hours after the start of doping the iron oxide content reached .44% which is sufficient to meet the color specification for heat absorbing glass although the aimed at optimum iron oxide content is .48%. At slightly more than 44 hours after the start of doping the finished heat absorbing plate glass being produced met both the color and quality specifications for heat absorbing glass, the iron oxide content was approximately 0.466% and all subsequent production was suitable for machine cutting.

A further graphic illustration of the advantages of the doping-bubbling procedures of this invention will be had by a comparison of curve B of FIG. 6 with curve A. Curve B depicts the doping and transition period for the most efficient procedure known in the art before the present invention, i.e., doping with 72% of the calculated deficiency in iron oxide during a 15 hour period without bubbling. Except for the time and percentage differences and the fact that bubbling was employed in one and not in the other, the tank and operating conditions for curves A and B were identical.

However, as shown by curve B not only was the prior art doping time somewhat longer (15 hours as compared with 12) but also the transition period (saving good glass to saving good glass) was considerably more than twice as long (101 hours as compared to 44). Moreover, it will be noted that the $Fe_2O_3$ plottings on curve B are more numerous and not too well aligned. This is because the ream in the glass doped by the prior art procedures makes it difficult to select representative samples for analysis and a larger number of samples must be taken. Similarly, the absence of ream in the glass doped by the procedures of the present invention is evidenced by the well aligned $Fe_2O_3$ plottings on curve A.

Specifically, curve B shows that, although the iron content of the glass being produced continued to rise throughout and beyond the 15 hour prior art doping period, it was not until some 67 hours after the start of doping that the iron oxide content reached the .44% required for acceptable color in heat absorbing glass; not until more than 106 hours after starting to dope that the glass was sufficiently free of ream to be of acceptable commercial quality; and not until 125 hours after doping that it was as ream free as the glass from which curve A was plotted.

Just why the doping-bubbling procedures of this invention give such surprising results is not completely understood but undoubtedly the glass is rendered considerably more homogeneous as a result of the bubbling and it seems probable that this results in the iron in the doping batch being utilized more efficiently and is largely responsible for the improvement in ream. Also, the bubbling offsets the natural tendency of the relatively dense doping glass to sink to the bottom of the tank and to at least partially solidify there with all of the resultant temperature and compositional problems that have been prevalent in this branch of the glass art.

But in any event, and by whatever means, the techniques of this invention have cut the non-productive time in changing from a low iron to a high iron glass in a continuously operating glass tank furnace in half or, differently expressed, have reduced it from a matter of days to a matter of hours.

They are also valuable in undoping such a tank. Thus, in changing over from heat absorbing plate glass to regular plate glass on the tank of FIG. 3, the $Fe_2O_3$ and $Co_3O_4$ were entirely eliminated from the glass batch ingredients being fed to the furnace and this procedure was continued while bubbling air through the molten bath, until the finished glass contained between 0.050% and 0.100% above the amount of iron required in the regular plate glass and, specifically about 0.175% $Fe_2O_3$. Thereafter the normal batch for regular plate glass was fed to the furnace.

However, it was subsequently found that improved results could be obtained by "cushioning" the iron in a manner to avoid any possibility of undershooting the amount required for the regular glass. This was done, when the glass exiting from the furnace as described above was found to have reached the $Fe_2O_3$ content approximating 0.175%, by adding ⅓ of the calculated amount of $Fe_2O_3$ required to go from 0.175% to 0.120% to the iron free glass batch being fed, for an 8 hour period. Then, for another 8 hour period, ⅔ of the calculated amount of $Fe_2O_3$ required to go from 0.175% to 0.120% was added to the iron free batch being fed. During all of this time the air bubbling was continued. And, thereafter, the normal batch for regular plate glass was fed to the furnace.

The principal reasons for the good results obtained from bubbling during undoping appear to be that it speeds up dilution and facilitates flushing of the higher iron glass from the tank while, at the same time making the current glass more homogeneous so that the ream problem is alleviated.

With further regard to this question of ream, the fact that the procedures of the present invention make it possible to produce ream free transition glass as well as ream free production glass is of considerable importance from another standpoint. Thus, while the off-color transition glass produced during either doping or undoping has little market value, it can be used as cullet in the high iron glass batches if the percentage of iron and cobalt present can be determined with sufficient accuracy to make the necessary adjustments to arrive at a desired batch composition. Glass with ream is difficult to analyze this accurately, but with substantially ream free glass there is no problem and so with this invention the transition glass becomes a usable asset instead of a liability.

As indicated above, the invention contemplates changing from relatively low iron glass such as regular plate glass to a higher iron glass such as heat absorbing, bronze or grey plate glass, and then back to regular glass either directly or after having first changed from one high iron glass to another. In so changing from one high iron glass to another on the fly it is preferable to change from heat absorbing to bronze and then to grey because, in this sequence, there is a constantly increasing iron content and the sequence ends with grey which is the only one of the three that employs nickel. There is some reduction in the selenium requirement in changing from bronze to grey but this is so slight (0.3 of a pound per 1000 pounds of sand) and selenium is so volatile that it poses no important problem.

Nevertheless, while the above logical sequence is preferred in the interests of attaining minimum transition times, it is possible by the use of the doping or undoping, or a combination of the doping and undoping procedures of the present invention to change over from a low to any high iron glass, to change from any high iron glass to any other and to change from any high iron glass to a low iron glass. Obviously, too, the invention is not limited to glasses which differ only in iron content because it has been shown that it is applicable to glasses differing in other materials, whether in extremely small or relatively larger amounts; and to glasses that differ in a plurality of ingredients and in differing amounts.

Indeed it is to be understood that the forms of the invention herewith shown and described are to be taken

We claim:

1. In the manufacture of glass in a continuously operating tank furnace containing a bath of molten glass and having a major upstream portion which includes a melting end and a refining end with a hot spot therebetween; the method of changing over from a first glass being produced in said furnace to the production of a second glass having an appreciably higher iron oxide content during the continuous operation of said furnace which comprises: charging into the molten bath of said first glass at said melting end the regular batch material used to produce said higher iron second glass along with a percentage of the calculated deficiency of iron oxide existing in said furnace before the start of said change over as compared to the iron oxide content required in said furnace for the production of said high iron second glass during a fixed period, and simultaneously bubbling fluid through said molten glass within said major upstream portion of said tank furnace.

2. A method as defined in claim 1 in which the regular batch for producing said higher iron second glass is charged along with approximately 90% of the calculated iron oxide deficiency during a period of about 12 hours, and said bubbling is continued throughout said period.

3. A method as defined in claim 1 in which the atmosphere over said major upstream portion of said furnace is separated from the furnace atmosphere downstream thereof by a hung arch, and said fluid is bubbed through the molten glass upstream of said arch.

4. A method as defined in class 1 in which said fluid is bubbled through the molten glass in the vicinity of said hot spot.

5. A method as defined in claim 4 in which said fluid is bubbled at spaced intervals along a line extending transversely of said furnace.

6. A method as defined in claim 1 in which said fluid is bubbled through the molten glass in an area upstream from said hot spot.

7. A method as defined in claim 1 in which said fluid is bubbled through the molten glass in the vicinity of said hot spot and also in an area upstream therefrom.

8. A method as defined in claim 1 in which said fluid is bubbled through the molten glass both upstream and downstream from said hot spot.

9. A method as defined in claim 1 in which said fluid is bubbled through the molten glass in the vicinity of the hot spot, in an area adjacent said melting end, and in an area therebetween.

10. A method as defined in claim 9 in which said fluid is bubbled through the molten glass in the vicinity of said hot spot and adjacent said melting end at spaced intervals along a line extending transversely of said furnace.

11. In the manufacture of glass as defined in claim 1; the method of changing over from a relatively high iron glass being produced in said furnace to the production of a glass having an appreciably lower iron oxide content during the continuous operation of said furnace which comprises: charging glass batch material substantially devoid of iron oxide to said continuously operating furnace during a transition period until the finished glass being removed from said furnace approaches to between 0.050% and 0.100% of the desired percentage of iron oxide required for said lower iron glass, simultaneously bubbling fluid through said molten glass within said major upstream portion of said tank furnace, and thereafter charging to said furnace glass batch material comprised of the desired proportion of the various ingredients required for the production of said lower iron glass.

12. A method as defined in claim 11 in which glass batch completely devoid of iron oxide as a separate ingredient is fed to said furnace during a first part of said transition period until the finished glass being removed from said furnace has an iron oxide content between 0.050% and 0.100% above that required for said lower iron glass, and glass batch having as a separate ingredient a percentage of the calculated amount of iron oxide required to go from said iron oxide content between 0.05% and 0.100% above and the iron oxide content required in said lower iron glass for the balance of said transition period to cushion said iron.

13. In the manufacture of glass as defined in claim 1; the method of changing over from a first glass being produced in said furnace to the production of a second glass having an appreciably higher iron oxide content, and then changing back to the production of a third glass having an appreciably lower iron oxide content than said second glass during the continuous operation of said furnace which comprises: charging into the molten bath of said first glass at said melting end the regular batch material used to produce said higher iron second glass along with a percentage of the calculated deficiency of iron oxide existing in said furnace before the start of said changeover as compared to the iron oxide content required in said furnace for the production of said high iron second glass during a fixed period, simultaneously bubbling fluid through said molten glass within said major upstream portion of said furnace during said fixed period, thereafter charging to said furnace only said regular batch material for said second glass during the production thereof, then charging glass batch material substantially devoid of iron oxide to said continuously operating furnace during a transition period until the finished glass being removed from said furnace has approximately the desired percentage of iron oxide required for said lower iron third glass, bubbling fluid through said molten glass within said major upstream portion of said furnace during said transition period, and thereafter charging to said furnace glass batch material comprised of the desired proportion of the various ingredients required for the production of said lower iron third glass.

References Cited

UNITED STATES PATENTS

| | | | |
|---|---|---|---|
| 2,900,264 | 8/1959 | Brown | 106—52X |
| 2,923,636 | 2/1960 | Swain | 65—134 |
| 3,326,702 | 6/1967 | Babcock | 65—32X |
| 3,296,003 | 1/1967 | Swift et al. | 65—134X |
| 3,364,042 | 1/1968 | Swain et al. | 65—134X |

FRANK W. MIGA, Primary Examiner

U.S. Cl. X.R.

65—178; 106—52; 65—136, 146